US009157992B2

(12) United States Patent
Wang et al.

(10) Patent No.: US 9,157,992 B2
(45) Date of Patent: Oct. 13, 2015

(54) KNOWLEDGE AIDED DETECTOR

(71) Applicant: Raytheon Canada Limited, Ottawa (CA)

(72) Inventors: Jian Wang, Waterloo (CA); Anthony M. Ponsford, Ottawa (CA); Emily Wang, Waterloo (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 479 days.

(21) Appl. No.: 13/674,563

(22) Filed: Nov. 12, 2012

(65) Prior Publication Data
US 2013/0201054 A1 Aug. 8, 2013

Related U.S. Application Data

(60) Provisional application No. 61/594,094, filed on Feb. 2, 2012.

(51) Int. Cl.
*G01S 7/292* (2006.01)
*G01S 7/41* (2006.01)
*G01S 13/52* (2006.01)
*G01S 13/04* (2006.01)
*G01S 13/524* (2006.01)
*G01S 13/02* (2006.01)

(52) U.S. Cl.
CPC .............. *G01S 13/04* (2013.01); *G01S 7/2922* (2013.01); *G01S 7/2927* (2013.01); *G01S 7/414* (2013.01); *G01S 13/0218* (2013.01); *G01S 13/5244* (2013.01); *G01S 13/5246* (2013.01); *G01S 2013/0227* (2013.01)

(58) Field of Classification Search
CPC .................. G01S 7/023; G01S 7/292–7/2927; G01S 7/414; G01S 13/5244; G01S 13/5246
USPC ...................................... 342/91–93, 159–164
See application file for complete search history.

(56) References Cited

U.S. PATENT DOCUMENTS 4,318,101 A 3/1982 Musha et al.
4,339,754 A 7/1982 Hammers et al.
(Continued)

FOREIGN PATENT DOCUMENTS

EP 0 132 232 A2 1/1985
EP 0 227 457 A2 7/1987

OTHER PUBLICATIONS

Lopez-Estrada, et al.; "A Hybrid Approach for Target Detection Using CFAR Algorithm and Image Processing;" Proceedings of the Fifth Mexican International Conference in Computer Science (ENC'04); IEEE; Jun. 2004; 8 pages.
(Continued)

*Primary Examiner* — Peter Bythrow
(74) *Attorney, Agent, or Firm* — Daly, Crowley, Mofford & Durkee, LLP

(57) ABSTRACT

Various embodiments are described herein for a detector and method that perform various types of CFAR detection on radar data including knowledge-aided CFAR detection, hybrid-CFAR detection and simplified censored CFAR detection. Knowledge about the type of local environment of a Cell Under Test and the proximity of the Cell Under Test to various types of noise can be used to select particular types of CFAR detection methods or combinations thereof. In other instances, certain parameters of a CFAR detection method can be adapted based on this knowledge.

36 Claims, 6 Drawing Sheets

(56) References Cited

U.S. PATENT DOCUMENTS

| | | | |
|---|---|---|---|
| 4,542,381 A * | 9/1985 | Wilhelm | 342/93 |
| 4,636,793 A * | 1/1987 | D'Addio et al. | 342/162 |
| 4,709,236 A | 11/1987 | Taylor, Jr. | |
| 4,839,655 A * | 6/1989 | Kiuchi | 342/93 |
| 4,970,660 A * | 11/1990 | Marchant | 702/181 |
| 5,457,462 A | 10/1995 | Mitsumoto et al. | |
| 5,465,095 A * | 11/1995 | Bryant | 342/159 |
| 5,499,030 A * | 3/1996 | Wicks et al. | 342/93 |
| 5,508,706 A * | 4/1996 | Tsou et al. | 342/192 |
| 5,539,412 A * | 7/1996 | Mendelson | 342/192 |
| 5,594,451 A * | 1/1997 | Krikorian et al. | 342/160 |
| 5,644,315 A * | 7/1997 | Long | 342/93 |
| 5,644,316 A * | 7/1997 | Lewis et al. | 342/174 |
| 5,798,728 A * | 8/1998 | Tomishima et al. | 342/93 |
| 5,808,579 A * | 9/1998 | Rademacher | 342/93 |
| 6,252,540 B1 * | 6/2001 | Hale et al. | 342/159 |
| 6,380,887 B1 * | 4/2002 | Suen | 342/162 |
| 6,456,231 B1 * | 9/2002 | McEwan | 342/93 |
| 6,822,606 B2 * | 11/2004 | Ponsford et al. | 342/192 |
| 7,741,992 B2 * | 6/2010 | Wang et al. | 342/93 |
| 8,013,781 B2 * | 9/2011 | Stockmann | 342/93 |
| 2003/0174088 A1 * | 9/2003 | Dizaji et al. | 342/93 |
| 2010/0073218 A1 * | 3/2010 | Stockmann | 342/146 |

OTHER PUBLICATIONS

Lu, et al.; "A Switching Constant False Alarm Rate Technique for High Frequency Surface Wave Radar;" CCECE 2004-CCGEI 2004; IEEE; May 2004, pp. 2081-2084.

Mashade, et al.; "Analysis of the censored-mean level CFAR processing in multiple target and nonuniform clutter;"IEEE Proc-Radar; vol. 142; No. 5; Oct. 1995; pp. 259-266.

Moazen, et al.; "A Robust CFAR Algorithm in Non-Homogenous Environments;" Antennas and Propagation Society International Symposium; IEEE; Jan. 2007; pp. 685-688.

PCT Search Report of the ISA for PCT/US2007/023104 dated Jul. 28, 2008.

PCT Written Opinion of the ISA for PCT/US2007/023104 Jul. 28, 2008.

PCT International Preliminary Report on Patentability of the ISA for PCT/US2007/023104 dated Jul. 28, 2008.

\* cited by examiner

KNOWLEDGE AIDED DETECTOR

CROSS REFERENCE TO RELATED APPLICATION

This application claims the benefit of U.S. Provisional Application No. 61/594,094 filed Feb. 2, 2012 under 35 U.S.C, §119(e) which application is hereby incorporated herein by reference in its entirety.

FIELD

The various embodiments described herein generally relate to radar systems and associated methods that utilize hybrid CFAR detection methods and knowledge of local noise environment for target detection.

BACKGROUND

High Frequency Surface Wave Radar (HFSWR) is effective for the continuous detection and tracking of ships, aircraft, icebergs and other surface targets that are beyond the horizon from a shore-based location. Accordingly, HFSWR can be used to enhance search and rescue activities as well as to monitor sea state, and detect illegal immigration, drug trafficking, illegal fishing, smuggling and piracy in certain areas such as the Exclusive Economic Zone. While any types of Constant False Alarm Rate (CFAR) detectors have been developed, it is difficult to maintain a constant false alarm rate because the noise varies under different conditions as well as at different locations.

SUMMARY OF VARIOUS EMBODIMENTS

In one aspect, in at least one embodiment described herein, there is provided a method of performing target detection on a Cell Under Test (CUT) associated with a reference window of range-Doppler radar values. The method comprises ordering the range-Doppler radar values in the reference window to produce ordered range-Doppler radar values obtaining an average value of a percentage of the ordered range-Doppler radar values based on a percentage threshold; multiplying the average value by a threshold coefficient to obtain a first threshold value; and detecting a target if a radar value associated with the CUT is larger than the first threshold value.

In another aspect, in at least one embodiment described herein, there is provided a method of performing target detection on a Cell Under Test (CUT) associated with a reference window of range-Doppler radar values. The method comprises ordering the range-Doppler radar values in the reference window to produce ordered range-Doppler radar values; obtaining an average value of a percentage of the ordered range-Doppler radar values based on a percentage threshold; multiplying the average value by a threshold coefficient to obtain a first threshold value; obtaining a second threshold value according to a second different CFAR detection method; setting a third threshold value to the larger of the first and second threshold values; and detecting a target if a radar value associated with the CUT is larger than the third threshold.

In another aspect, in at least one embodiment described herein, there is provided a method of performing target detection on a Cell Under Test (CUT) associated with a plurality of range-Doppler radar values. The method comprises classifying a local noise environment of the CUT using a first reference window; selecting a size and a shape of a second reference window based on the classified local noise environment of the CUT; selecting a type of Constant False Alarm Rate (CFAR) detection method and an orientation of the second reference window depending on a location of the CUT in relation to at least one of an ionospheric duller region and a Bragg line; and applying the selected GEAR detection method to detect a target at the CUT in the second reference window.

In another aspect, in at least one embodiment described herein, there is provided a detector for a radar system for performing target detection on a Cell Under Test associated with a reference window of range-Doppler radar values. The detector comprises an input for receiving the range-Doppler radar values of the reference window and the CUT; a processor coupled to the input and configured to process the range-Doppler radar values of the reference window and the CUT to provide an indication of target detection by ordering the range-Doppler radar values in the reference window to produce ordered range-Doppler radar vales, obtaining an average value of a percentage of the ordered range-Doppler radar values based on a percentage threshold, multiplying the average value by a threshold coefficient to obtain a first threshold value, and detecting a target if a radar value associated with the CUT is larger than the first threshold value; and an output coupled to the processor for providing an indication of target detection to a component of the radar system.

In another aspect, in at least one embodiment described herein, there is provided a detector for a radar system for performing target detection on a Cell Under Teat (CUT) associated with a reference window of range-Doppler radar values. The detector comprises an input for receiving the range-Doppler radar values of the reference window and the CUT; a processor coupled to the input and configured to process the range-Doppler radar values of the reference window and the CUT to provide an indication of target detection by ordering the range-Doppler radar values in the reference window to produce ordered range-Doppler radar values, obtaining an average value of a percentage of the ordered range-Doppler radar values based on a percentage threshold, multiplying the average value by a threshold coefficient to obtain a first threshold value, obtaining a second threshold value according to a second different CFAR detection method, setting a third threshold value to the larger of the first and second threshold values, and detecting a target if a radar value associated with the CUT is larger than the third threshold; and an output coupled to the processor for providing an indication of target detection to a component of the radar system.

In another aspect, hi at least one embodiment described herein, there is provided a detector for a radar system for performing target detection on a Cell Under Test (CUT) associated with a plurality of range-Doppler radar values. The detector comprises an input for receiving the plurality of range-Doppler radar values and the CUT; a processor coupled to the input and configured to perform target detection on the CUT by classifying a local noise environment of the CUT using a first reference window; selecting a size and a shape of a second reference window based on the classified local noise environment of the CUT; selecting a type of Constant False Alarm Rate (CFAR) detection method and an orientation of the second reference window depending on a location of the CUT in relation to at least one of an ionospheric clutter region and a Bragg line; and applying the selected CFAR detection method to detect a target at the CUT in the second reference window; and an output coupled to the processor for providing an indication of target detection to a component of the radar system.

In another aspect, in at least one embodiment described herein, there is provided a computer readable medium comprising a plurality of instructions executable on a microprocessor of an electronic device for adapting the electronic device to implement a method of performing target detection on a Cell Under Test (CUT) in a reference window of range-Doppler radar values. The method comprises ordering the range-Doppler radar values in the reference window to produce ordered range-Doppler radar values; obtaining an average value of a percentage of the ordered range-Doppler radar values based on a percentage threshold; multiplying the average value by a threshold coefficient to obtain a first threshold value; and detecting a target if a radar value associated with the CUT is larger than the first threshold value.

In another aspect, in at least one embodiment described herein, there is provided a computer readable medium comprising a plurality of instructions executable on a microprocessor of an electronic device for adapting the electronic device to implement a method of performing target detection on a Cell Under Test (CUT) in a reference window of range-Doppler radar values. The method comprises ordering the range-Doppler radar values in the reference window to produce ordered range-Doppler radar values; obtaining an average value of a percentage of the ordered range-Doppler radar values based on a percentage threshold; multiplying the average value by a threshold coefficient to obtain a first threshold value; obtaining a second threshold value according to a second different CFAR detection method; setting a third threshold value to the larger of the first and second threshold values; and detecting a target if a radar value associated with the CUT is larger than the third threshold.

In another aspect, in at least one embodiment described herein, there is provided a computer readable medium comprising a plurality of instructions executable on a microprocessor of an electronic device for adapting the electronic device to implement a method of performing target detection on a Cell Under Test (CUT) associated with a plurality of range-Doppler radar values. The method comprises classifying a local noise environment of the CUT; selecting a size and a shape of the reference window based on the classified local noise environment of the CUT; selecting a type of Constant False Alarm Rate (CFAR) detection method and an orientation of the reference window depending on a location of the CUT in relation to at least one of an ionospheric clutter region and a Bragg line; and applying the selected CFAR detection method to detect a target at the CUT.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DETAILED DESCRIPTION OF THE EMBODIMENTS

Figure 1:
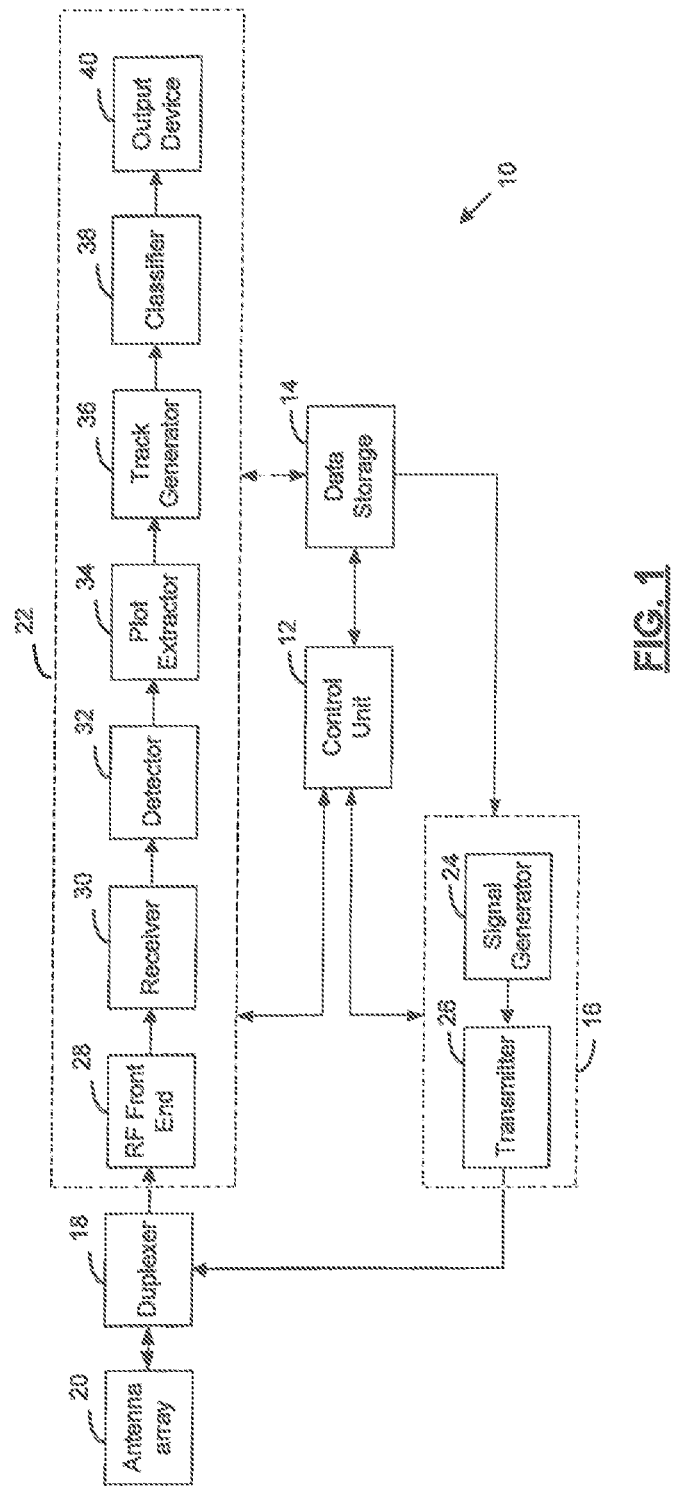
FIG. 1 is a block diagram of an example embodiment of a radar system.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process deserted below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements, in addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the term "coupled" used herein indicates that two elements can be directly coupled to one another or coupled to one another through one or more intermediate elements. It should also be noted that the term Cell Under Test (CUT) denotes a current radar data element that is being processed for target detection. The CUT can also be referred to as a test cell. The CUT will typically be a range cell of a range-Doppler plot (e.g. 2D data matrix), which is a radar data value at a particular range value and Doppler value. In an alternative embodiment, the CUT can be a range-Doppler-beam plot, which is a radar data value at a particular range, Doppler and beam index which can be processed resulting in a 3-D CFAR detector. It should also be noted that the term beam can generally be interchanged for the term azimuth. For example, the detection methods described herein can be applied to either range-Doppler-Azimuth data or range-Doppler-beam data.

The various embodiments described herein generally relate to hybrid CAR detection methods that incorporate knowledge about the local noise environment of a Cell Under Test (CUT) that is being examined to determine if it contains a target. The hybrid CFAR detection methods described herein have been found to increase the detection sensitivity of HFSWR systems for small vessels in both clutter and noise-like environments as well as for fishing vessels at higher sea states. The hybrid CFAR detection methods described herein also improve the range at which vessels can be detected during the our of darkness by permitting detection to the edge of ionospheric clutter. This is important since more robust and reliable detection will result in more consistent tracking.

In one example embodiment provided herein, a detection method is provided which employs a classifier technique to obtain information about the local environment of a CUT. With the knowledge gained from the local surroundings, the window associated with the CUT (also known as a CFAR reference window) is subsequently adapted based on the local noise/clutter environment. This adaptation can include at least one of varying the size of the window, the shape of the window and the orientation of the window. Hybrid CFAR detection methods including Order Statistic (OS) FAR, Smallest Of (SO)-CFAR and simplified censored Cell Averaging (CA)-CFAR, for example, are then applied for target detection based on the knowledge learned. In alternative embodiments, the hybrid CFAR detection methods can also include Greatest Of (GO)-CFAR and Trimmed Mean (TM)-CFAR. In particular, certain combinations of CFAR detection methods are used based on the knowledge of the local environment of the CUT in order to take advantage of certain properties of the CFAR detection methods while minimizing certain shortcomings. In addition, in at least some cases, the detection threshold can be adaptively adjusted to minimize the probability of false alarms in high clutter regions.

CFAR detectors that employ at least one of the detection methods described herein can adapt to the local clutter surrounding a CUT and suppress the clutter breakthrough that can occur when operating in non-homogenous environments. In addition, CFAR detectors that employ at least one of the detection methods described herein can adapt to provide more realistic threshold estimation in homogenous environments and perform more robustly in the presence of multiple targets. As a result these CFAR detectors will have an advantage in detecting weak targets in both homogenous and non-homogenous environments as compared to conventional detectors which do not incorporate knowledge of the local environment and do not employ a combination of CFAR methods.

Referring now to FIG. 1, shown therein is a block diagram of an example embodiment of a radar system 10. The radar system 10 can be used as an HFSWR or another type of radar system. The radar system 10 is typically installed along a coastal line. The radar system 10 includes a control unit 12, a data storage unit 14, a transmission subsystem 16, a duplexer 18, an antenna array 20, and a receiver subsystem 22. The transmission subsystem 16 includes a signal generator 24 and a transmitter 26. The receiver subsystem 22 includes an RF front end 28, a receiver 30, a detector 32, a plot extractor 34, a track generator 36, a classifier 38 and an output device 40. In alternative embodiments, the classifier 38 may be additionally, or optionally, coupled to at least one of the detector 32 and the plot extractor 34 to classify detected targets. This allows target classification to be done at various stages of target tracking, including during or after detection, plot extraction or track formation.

It should be noted that there can be alternative embodiments in which the radar system 10 may have a different layout or configuration, including different components, as is commonly known by those skilled in the art. For example, in some embodiments, some of the components may be implemented by the same hardware components. Accordingly, the following description of the components of the radar system 10 is meant only to provide an example and it is understood by those skilled in the art that other system architectures and components can be used. However, it should be understood that each of these alternative embodiments can utilize the various CFAR detection methods described herein.

The control unit 12 controls the activity of the radar system 10 and although connections are shown only to the transmitter subsystem 16 and the receiver subsystem 22, it is understood that the control unit 12 can provide control signals to other components of the radar system 10. In general, the control unit 12 provides control signals to the signal generator 24 and the transmitter 26 for generating radar pulses to be transmitted via the antenna array 20. The control unit 12 also provides control signals to the receiver subsystem 22 for receiving return radar signals due to reflections of the transmitted radar pulses. The control unit 12 can also control the duplexer 18 to allow either the transmitter subsystem 10 or the receiver subsystem 22 to be connected to the antenna array 20 for transmitting or receiving signals. The control unit 12 can then direct the activities of the remaining components of the radar system 10 to process the received return radar signals and provide information on any detected targets. The control unit 12 can be coupled to the various components of the radar system 10 via a data bus such as a VME (VERSAmodule Eurocard) bus for example however, other suitable data buses may also be used.

The data storage unit 14 generally includes one or more temporary memory elements, such as RAM, as well as one or more permanent memory elements such as flash memory or ROM. The data storage unit 14 stores various parameters to avow the radar system 10 to function properly. The parameters can be signal generation parameters to control the properties of the pulses that are transmitted by the radar system 10 as well as parameters that are used in the processing of received radar pulses for target detection. The data storage unit 14 can also be used to record operational results.

The signal generator 24 comprises circuitry that can be used to generate waveforms to produce radar pulses when transmitted by the antenna array 20. Various waveforms can be used to generate the transmitted radar pulses such as, but not limited to, simple unmodulated waveforms, modulated complex waveforms such as nonlinear FM waveforms as well as other suitable waveforms transmitted in a simplex frequency, dual frequency or other suitable fashion as is commonly known by those skilled in the art, A variable Pulse Repetition Frequency (PRF) may also be used across different coherent processing intervals (CPIs) to combat the bond speed problems. However, a constant PRF across different CPIs can also be used. More sophisticated pulse-coded or frequency-coded Electromagnetic (EM) pulses may be used to combat range-wrap which occurs when a reflected EM pulse (in response to a previously transmitted EM pulse) is received by the antenna array 20 after subsequent EM pulses have been transmitted.

The transmitter 26 can be a solid-state transmitter, a tube transmitter, or any other suitable transmitter as is commonly known by those skilled in the art. The transmitter 26 typically includes up-conversion circuitry and amplification circuitry to shift the frequencies of the generated waveforms to the appropriate frequency range for transmission and to amplify the generated waveforms to a suitable power level for transmission across the surveillance region. The transmitter 26 also typically includes components, such as a waveguide assembly, to direct the amplified signals to the antenna array 20 via the duplexer 18 for transmission to the surveillance region.

The duplexer 18 is typically a high-power duplexer that directs transmitted signals to the antenna array 20 and return signals to the receiver subsystem 22 via separate waveguide assemblies. The duplexer 202 provides high isolation between the receiver subsystem 22 and the transmitter subsystem 16. The duplexer 18 typically includes directional couplers, circulators, high power switches and loads (all not shown) in certain configurations, as is known by those skilled in the art, to properly route the transmission signals and the received reflected pulses. The couplers can be used to monitor the reverse power from the antenna array 20, due to reflections of the transmission signals, for any dangerous conditions.

The antenna array 20 can be a scanning antenna, a phased array antenna, or any other suitable antenna. For example, the antenna array 20 can comprise an or transmitting antenna and an omni-directional receiving antenna array (both not shown) as well as the hardware and software needed for antenna operation. When provided with a transmission signal, the transmitting antenna generates a train of EM pulses which illuminate the desired surveillance area. The receiving antenna array typically has high and equal gain over the entire surveillance area. Objects in the surveillance area reflect the EM pulses towards the receiving antenna array which collects radar data. Some of the objects may be elements that are to be detected (referred to as "targets") while the rest of the objects are elements that do not have to be detected (referred to as "clutter").

The RF front end 28 typically includes analog and digital circuitry, such as protection circuitry, sensitivity time control (STC) circuits, one or more filters, amplifiers, and mixers, and an analog to digital converter (all not shown) in certain configurations, as is commonly known by those skilled in the art. These elements perform filtering, amplification, and down-conversion (i.e. demodulation to a lower frequency band) to provide pre-processed digital radar data. In some cases, heterodyning can be used to demodulate the filtered data from the RF band to an IF band where analog to digital conversion can take place.

The receiver 30 processes the pre-processed radar data to produce three dimensional range-Doppler-beam radar data of the surveillance area. The processing performed by the receiver 30 depends on the hardware associated with the radar system 10. The receiver 30 typically uses one or more pulse compressors or matched filters that have a transfer function or impulse response that is matched to the transmitted radar pulses in order to provide filtering to remove extraneous unwanted signals. The filtered data is then typically demodulated to the baseband where low-pass filtering and downsampling occurs. The data is then separated into CPIs for analysis in which the data is range-aligned and beamformed to provide range-azimuth data (also known as range-beam data). Beamforming gives the appearance that the antenna array 20 is tuned to a certain region of the surveillance area defined by the azimuth value that is used in the complex exponential weights employed during beamforming. In this fashion, many beams may be formed to simultaneously cover the entire surveillance area. The range information in the range-azimuth data provides an estimate of a possible targets distance from the antenna array 20. The azimuth information in the range-azimuth data provides an estimate of the angle of the possible target's location with respect to the center of the antenna array 20. The receiver 30 can then apply Doppler filtering to the ranger azimuth data to produce three dimensional range-Doppler-azimuth data (also known as range-Doppler-beam data). The Doppler information in the range-Doppler-azimuth data provides an estimate of a possible targets radial velocity by measuring the possible target's Doppler shift, which is related to the change in frequency content of a given radar pulse that is reflected by the possible target with respect to the original frequency content of the given radar pulse.

The detector 32 then locates possible targets from the radar data provided by the receiver 30 by applying CFAR detection methods on a range cell basis by processing the range-Doppler-azimuth cell for a current range, Doppler and azimuth, A range cell is a cell on a range-Doppler plot between certain azimuth and range values, for example between 0 and 5 degrees and 10 and 11 nautical miles. The range cell can also be referred to as a test cell or a Cell Under Test (CUT). In general, the detector 32 looks for a peak at the CUT with respect to a portion of the range-Doppler values that surround the CUT and form a window. This is done by comparing the amplitude of the CUT with the amplitudes of the neighboring cells. The detection is made difficult due to the different types of noise that can be encountered within the window based on the range and azimuth of the CUT. Various CFAR detection methods are discussed herein that can deal with these various forms of noise to provide improved detection.

Figure 2:
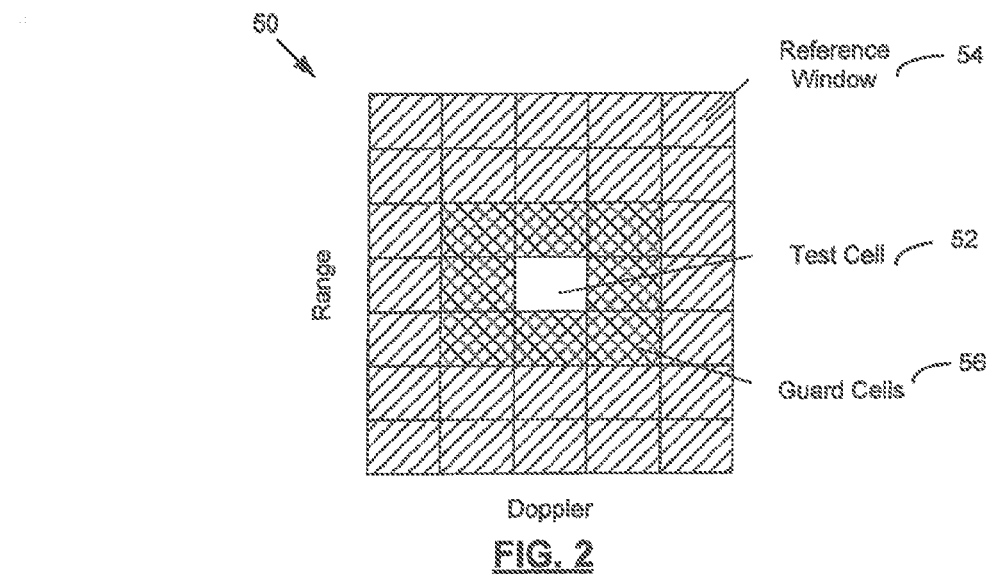
FIG. 2 is a schematic of a reference window used in CFAR detection.

An example of a window 50 that can be used for detection processing is shown in FIG. 2. The window 50 includes a CUT 52, a reference window region 54 (hereafter referred to as a reference window) and a guard region 56. The CUT 52 is usually at the center of the window 50 and is surrounded by the guard region 56 which is in turn surrounded by the reference window 54. The CUT 52 can be thought of as being in the reference window 54 or associated with the reference window 54. The reference window 54 is used to estimate the background noise level in the vicinity of the CUT 56. The guard region 56 is used to prevent any portion of a possible target, in the CUT 52, from being used to estimate the background noise level since the possible target in the CUT 52 may spread to other cells due to the radar signature (e.g. size) of the possible target as well as spectral leakage when generating the range-Doppler azimuth plot, as is commonly known by those skilled in the art.

The plot extractor 34 receives and combines the candidate targets to form plots through a process known as plot extraction, which is commonly known to those skilled in the art. The plot extractor 34 filters the possible targets to reject all of those possible targets that do not conform to the range, Doppler and azimuth properties that are expected for a particular type of target such as, but not limited to, aircraft targets, for example.

The track generator 36 receives the plots and generates tracks based on the temporal variation of the measurement information for the possible targets for a sequence of plots. More specifically, the track generator 36 analyzes a sequence of plots and associates successive detections of a possible target to form a track for the possible target. Accordingly, the track generator 38 determines the movement of the possible targets through the surveillance area for a certain time period.

The classifier 38 receives the tracks generated by the track generator 36 and analyzes the tracks by measuring values for certain features of the tracks in order to classify the tracks as belonging to certain categories such as aircraft, birds, ground clutter, weather clutter, environmental or geographical interference, and the like. Another classifier may be trained for particular aircraft or non-aircraft targets and applied to the output of the classifier 38 to extract particular targets from aircraft or non-aircraft outputs. For instance, the non-aircraft class can be expanded to include birds, windmills, etc, while the aircraft class can be expanded to include helicopters, light aircrafts, etc. Target classification can be performed at a single stage, or alternatively data from multiple stages can be combined to produce a multi-source classifier. For instance, the classifier 38 may be used to simplify the output of the track generator 36 by examining plot data and candidate track data to perform pruning to remove datasets that are not of interest.

The output device 40 can provide information on the possible targets that are being tracked by the radar system 10. The output device 40 can be a monitor, a printer or other suitable output means. The output device 40 can receive classified tracks from the classifier 38 and provide output information on the classified tracks. In other embodiments, the output device 40 can receive information from other components of the radar system 10 and output this information.

The detection process is hindered by the addition of noise in the windows associated with a CUT. This may result in the missed detection of a target or the false detection of noise as a target. The noise is problematic since there will be a varying noise level in different cells as well as for radar data collected in different CPIs, in different sea-state conditions, during different times of day and season and at different locations. The major sources of radar noise include self-interference, such as ocean clutter and ionospheric clutter, as well as external interference. Self-interference results from the operation of the radar system 10 while external interference is independent of the operation of the radar system 10.

Ionospheric clutter is one of the most significant causes of interference and includes EM pulses that reflect off of the earth's ionosphere and return directly to the radar system 10 (e.g. near vertical incidence clutter), and EM pulses that bounce off of the ionosphere, reflect from the ocean and return to the radar along the reverse path (e.g. sky-wave self-interference or range-wrap clutter), in other words, ionospheric clutter is defined as those radar echoes whose propagation paths involve ionospheric layers. In general, ionospheric clutter accumulates in an annular band spanning several range cells, all azimuth cells and most of the ship Doppler band. This narrow band of range cells corresponds to the height or multiple heights of the ionospheric layers relative to the HFSWR installation site. Near vertical incidence ionospheric clutter is also characterized as being very strong, isolated in range and smeared in the Doppler dimension over many milli-Hertz. During the night, ionospheric clutter is at its highest level due to the disappearance of the D layer and the merging of the F1 and F2 layers. Furthermore, the characteristics of ionospheric clutter vary with season and other environmental parameters so it is not easy to introduce a robust method to suppress ionospheric noise.

The sea surface comprises a number of waves having different wavelengths and amplitudes. Sea or ocean clutter results from EM pulses that are reflected by ocean waves that are harmonics of the radar wavelength. Two large peaks that dominate the ocean clutter are referred to as Bragg lines which appear as two columns of peaks in a range-Doppler plot along all range cells at Doppler frequencies determined by the operating frequency of the radar system 10. The Bragg lines can smear radar detection performance at their corresponding Doppler frequencies and mask the returns from actual targets in these areas. However, there is also higher order scatter, which is related to the sea-state (i.e. surface wind speed and duration) and results in additional peaks and a continuum of ocean clutter between the Bragg lines. This continuum of ocean clutter contains energy that is related to the sea-state, which can limit the detection of small, low-speed targets such as ships.

External interference includes co-channel interference, atmospheric interference and impulsive noise. Co-channel interference results from both local and distant users of the HFSWR frequency band, such as television broadcasters. This interference is range independent and occurs at specific Doppler ranges. This interference is also highly directive because it originates from spatially correlated point sources. Co-channel interference may be avoided by choosing alternate carrier frequencies for transmitting the EM pulses. However, co-channel interference from distant sources poses a more serious problem since this interference is more random in time and frequency. Furthermore, there is typically greater co-channel interference at night than during the day due to the lack of D layer absorption during the night.

Atmospheric interference is spatially white with a level that varies as a function of frequency, time of day, season and geographical location. For instance, the noise level, due to atmospheric interference at the lower end of the High Frequency (HF) band, increases about 20 dB during the night in comparison with daytime levels.

Impulsive noise is due to lightning and manifests itself as a sequence of rapid pulses that are randomly distributed in time and have amplitudes with large dynamic range. Impulsive noise is not spatially white and results from both local and distant storms. Impulsive noise usually occurs throughout the daily operation of an HFSWR system. Impulsive noise results in an increase in the background noise level. In addition, the frequency characteristics of impulsive noise can change as a function of the intensity of local storm activity.

In some embodiments, the receiver 30 can process the received radar data using noise and interference cancellation methods before the radar data is sent to the detector 32. For example, processing can be done to remove impulsive noise and external interference in the radar data before sending the radar data to the detector 32. However, certain types of clutter still remain in the radar data that is sent to the detector 32.

Figure 3:
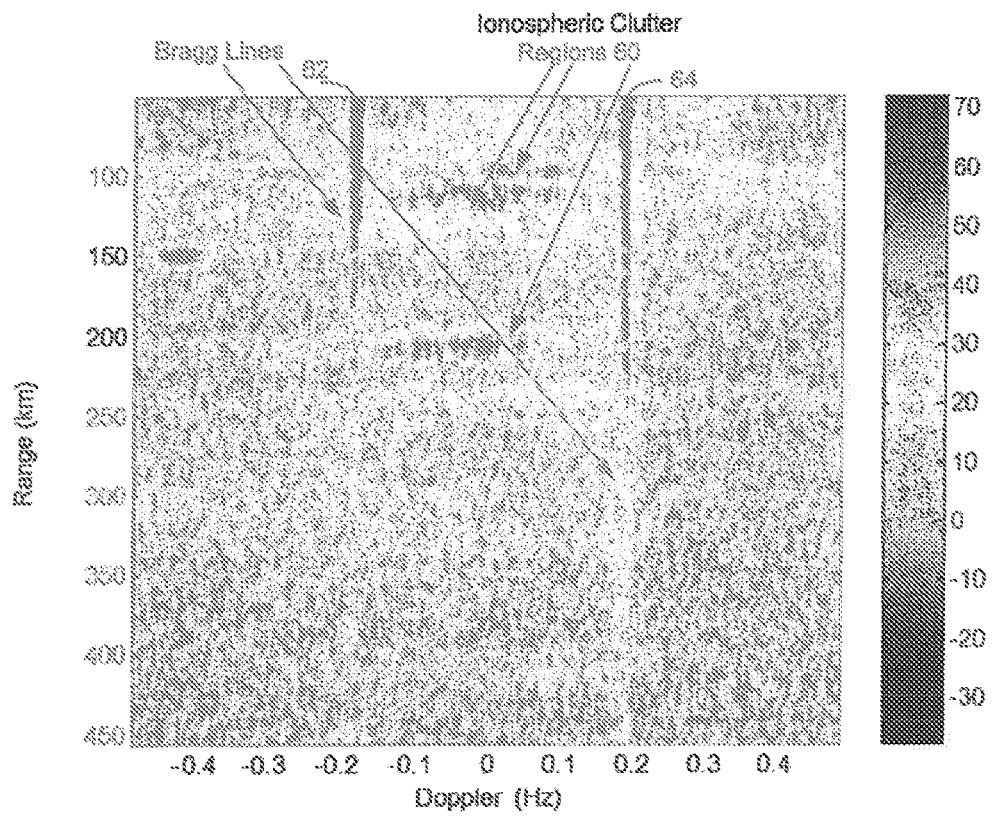
FIG. 3 is a diagram of an actual range-Doppler plot showing regions with ionospheric clutter and regions with Bragg lines.
Figure 4:
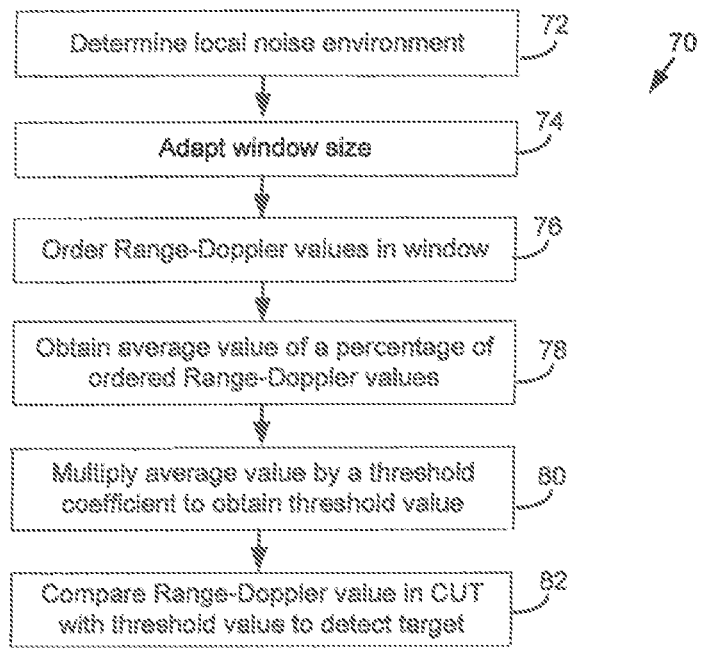
FIG. 4 is a flowchart of an example embodiment of a simplified censored Cell Averaging (CA) FAR detection method.

An example of the different types of clutter that are particularly problematic is illustrated in FIG. 3 which shows an actual range-Doppler plot that comprises sea clutter, ionospheric clutter and external noise. Ionospheric clutter is particularly intense in the annular regions 60 while the Bragg lines manifest themselves as two rectangular regions 62 and 64. The ionospheric clutter and sea clutter dominate particular areas of the Range-Doppler map and the statistics associated with these different types of clutter vary from CPI to CPI. The sea clutter distributes along the range dimension, while the ionosphere clutter generally distributes along the Doppler dimension.

Variability in noise level due to the many different types of interference affects the detection performance of an HFSWR system in several ways. Firstly, this noise can result in the missed detection of a target, since there can be instances in which the target is almost indistinguishable from the noise. Secondly, the noise can comprise a peak in the CUT which may result in the false detection of noise as a target. In addition, a detector of an HFSWR system can output a widely varying number of detections in different CPIs since there can be times at which the noise level can be quite variable over time. This has a detrimental effect on the components of the HFSWR system that follow the detector (i.e. the plot extractor and the tracker). In particular, if the detector 32 produces too many detections then the track generator 36 will overload. It is thus desirable to have a relatively constant number of detections in each CPI regardless of the varying noise level due to the different types of interference.

One CFAR detection method that has been popular recently is the censored Cell Averaging (CA)-CFAR detection method. Rather than estimate the mean level of unguarded cells in the reference window, the censored CA- CFAR detector identifies and removes cells that exceed an adaptive threshold in the reference window as these are considered to be potential interference cells. In a first step, a first threshold is selected for censoring cells such that any cells in the reference window with amplitudes larger than the first threshold are removed to produce a first censored reference cell set. A second threshold is then computed based on the censored reference cell set so as to provide a desired false alarm rate, which is the same as for the previously computed threshold. The uncensored cells in the first censored reference cell set with amplitudes larger than the second threshold are then removed to produce a second censored reference cell set. This procedure is then repeated until there are no uncensored cells in the reference window with amplitudes that exceed the most recently computed threshold. The uncensored cells that remain form the background for this reference window and the new CFAR threshold will be the mean level of the remaining uncensored cells multiplied by a preset scaling factor. The thresholds are calculated based on the desired false alarm rate and expected statistical distribution of the radar data. Normally a constant false alarm rate is used for all iterations. However, the computational complexity of the censored CA-CFAR detector limits its practical implementation.

To address the computational complexity of the conventional censored CA-CFAR detection method, a novel simplified censored CA-CFAR detection method has been developed as described herein. In this simplified censored CAM CFAR detection method, an estimate of the mean level of the background environment of the CUT is taken as a percentage of the sorted cells in the reference window. In addition, there can be alternative embodiments in which the size and shape of the reference window can be adapted to deal with homogeneous or non-homogeneous environments prior to estimating the can level of the background environment of the CUT.

Referring now to MG. 4, shown therein is a flowchart of an example embodiment of a simplified censored CA-CFAR detection method 70 that can be used to perform target detection on a CUT in a reference window of range-Doppler radar values. The detection method 70 is more computationally efficient compared to the conventional implementation of the censored CA-CFAR method that was described previously. The simplified censored CA-CFAR detection method 70 also provides a more accurate estimate on the background/noise compared to a conventional CA-CFAR detection method while also retaining the advantages of the CA-CFR and OS-CFAR detection methods and working well in both homogeneous and non-homogenous environments.

At step 72, the method 70 comprises determining characteristics of the local noise environment (i.e. background noise) of the CUT. This includes determining whether the local noise environment is homogeneous or non-homogenous, which can be ascertained in several different ways. For example, the local noise environment can be determined to be homogeneous or non-homogeneous by determining a statistic of the range-Doppler values in the reference window and comparing the statistic with a predefined noise threshold. The statistic can be the variance of the range-Doppler values in the reference window. In an alternative embodiment, the statistic can be the standard deviation of the range-Doppler values in the reference window. In another alternative embodiment, a square detector can be applied to the range-Doppler values in the reference window to generate the statistic.

For example, when a square detector is used to generate the statistic, the range-Doppler cells are assumed to be exponentially distributed with a Probability Distribution Function (PDF) as shown in equation 1 having a mean $\mu_x$ and variance $\sigma_x^2$ as shown in equations 2 and 3, $$p(x) = \frac{1}{\beta} e^{-(x-\alpha)/\beta} \quad (1)$$

$$\mu_x = \int_\alpha^\infty x \cdot p(x) dx = \alpha + \beta \quad (2,3)$$

$$\sigma_x^2 = \int_\alpha^\infty x^2 \cdot p(x) dx - \mu_x^2 = \beta^2$$

Based on equations 2 and 3, the measured standard deviation $\sigma_x$ can be used to identify the type of background distribution and can therefore be used to classify noise background.

The Kullback-Leibler (K-L) criteria, provides a measurement of the dissimilarity between any two distributions. Accordingly, this criterion can be used as the measurement of the distribution difference between two range-Doppler cells. Therefore, the distance between two independent distributions corresponding to two separate cells from the same reference window is calculated as shown in equation 4.

$$I(p_1(x), p_2(x)) = \int_{\alpha_1}^\infty p_1(x) \log\left(\frac{p_1(x)}{p_2(x)}\right) dx \quad (4)$$

$$= \int_{\alpha_1}^\infty \frac{1}{\beta_1} e^{-(x-\alpha_1)/A} \log\left(\frac{\frac{1}{\beta_1} e^{-(x-\alpha_1)/\beta_1}}{\frac{1}{\beta_2} e^{-(x-\alpha_2)/\beta_2}}\right) dx$$

$$= \log\frac{\beta_2}{\beta_1} + \frac{\alpha_1 + \beta_1 - \alpha_2 - \beta_2}{\beta_2}$$

Assuming that both distributions $p_1(x)$ and $p_2(x)$ have similar $\{\alpha_i\}$ in which $\alpha$ and $\beta$ can be calculated from equations 2 and 3, then the K-L criteria becomes a function of standard deviations as shown in equation 5.

$$I(p_1(x), p_2(x)) = \log\frac{\sigma_2}{\sigma_1} + \frac{\sigma_1 - \sigma_2}{\sigma_2} \quad (5)$$

In practice it is difficult to estimate the variance value of each range-Doppler cell. Therefore from Eq. (4) the distance between the estimated variance of background noise and the variance of cells in the reference window is used since it is assumed that all cells' distributions are independent of one another. When the calculated distance is greater than a preset threshold ($\xi$), it is determined that the reference window is in a non-homogeneous region; otherwise it is determined that the reference window is in a homogeneous region. The preset threshold is determined by comparing the classification results with the signal spectrum to verify that the classification results consistently match the clutter spectrum and noise background. Another way to set the preset threshold $\xi$ is to examine the far-range target detection probability increase.

It is well known that radar echoes have Gaussian distributions after Fourier transform. Therefore, it has been assumed that the noise background in a range-Doppler map has a Gaussian distribution with a variable mean and variance. However, conventional CFAR detection methods that seek the target in a homogeneous background fail to reach their expected performance when they are used in non-stationary mixed environment. Step 72 of the method 70 avoids this pitfall by determining whether the background noise is homogeneous or non-homogeneous and several later steps of the method 70 incorporate this information.

At step 74, the reference window size, shape and orientation are adapted based on the local noise environment of the CUT. A fixed reference widow will yield a biased threshold near the clutter and potentially suppress targets nearby. Accordingly, an adaptive window can be used by the CFAR detection method 70 to overcome this problem. At step 74, if the CUT is in a homogeneous environment then the shape of the reference window is a rectangle which is increased in size or stretched along the range dimension and reduced in size or shrunk along the Doppler dimension. However, if the CUT is in a non-homogenous environment then the shape, and optionally the size, of the reference window can be adapted based on the background clutter by increasing a first dimension of the window that is parallel to the duffer distribution and reducing the second dimension of the window which is orthogonal to the clutter distribution. In this case, in order to adapt the size and shape of the reference window, further measurements are taken, which can include determining if the CUT is in ionospheric clutter, is near ionospheric clutter or is away from ionospheric clutter as well as whether the CUT is near a Bragg Line. Further details on these measurements are provided in the description of FIGS. 8 and 9. It should be noted that the reference window size used in step 72 is different from the window used in step 74 since the reference window used in step 72 has to be large enough to contain any possible reference window that is adapted in step 74. The reference window in step 72 is fixed for each radar site. The selection of window size varies with radar site, sea state and time of day.

Figure 5:
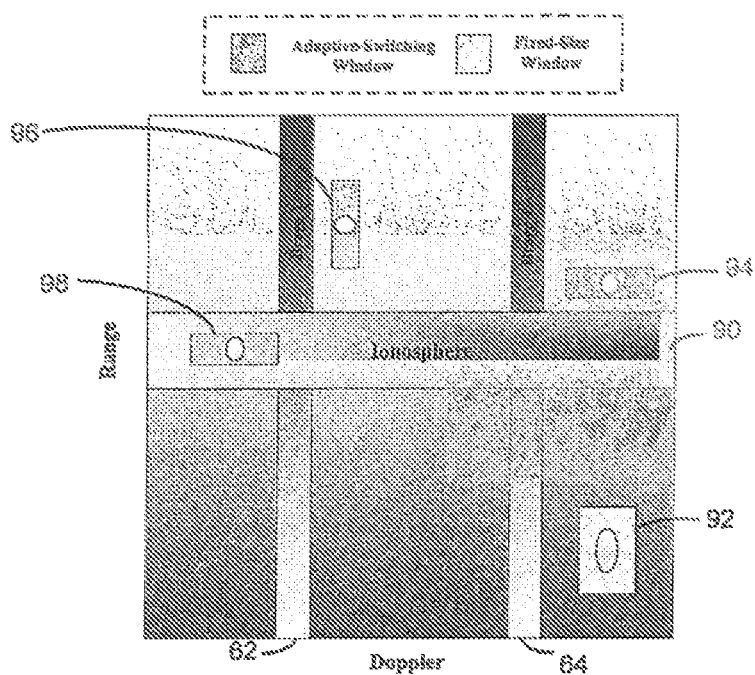
FIG. 5 is a diagram illustrating example embodiments of adaptive reference windows that can be used in the CFAR detection methods described herein.

For example, FIG. 5 shows a range-Doppler plot for a given beam with example embodiments of adaptive windows that can be used for CFAR detection. The range-Doppler plot comprises an ionospheric clutter region 90, Bragg lines 62 and 64 and several different reference windows 92, 94, 96 and 98. The reference window 92 has a fixed size and is used in conventional CFAR detectors. The reference windows 94, 96 and 98 are adaptive and have sizes and shapes that are adjusted based on the local noise environment and are used with the CFAR detection methods described herein. The reference window 94 is near the ionospheric clutter region 90 and has been oriented such that it has a rectangular shape with its length oriented along the Doppler dimension. The reference window 96 is not near the ionospheric clutter region 90 but is near the Bragg line 62 and has been oriented to have a rectangular shape with its length oriented along the range dimension. The reference window 98 is within the ionospheric clutter region 90 and has been oriented such that it has a rectangular shape with its length oriented along the Doppler dimension. It should be noted that each of the adaptive reference windows 94 to 98 has a smaller ratio of its two dimensions (length and height) when compared to the conventional fixed reference window 92. Accordingly, the reference window is oriented along the Doppler dimension if the CUT is determined to be in or near an ionospheric clutter region, while the reference window is oriented along the range dimension if the CUT is near Bragg lines and is not in an ionospheric clutter region or is not near an ionospheric clutter region.

In an alternative embodiment, the location of the reference window can also be shifted depending on the location of the CUT. For example, if the CUT is near an ionospheric clutter region, then the reference window can be shifted to exclude as much of the ionospheric clutter region as possible. The direction of the shift can be determined by comparing the relative magnitude of the cells in the reference window. For example, the ratio of the mean value of the cells in the top half of the reference window to the mean value of the cells in the bottom half of the reference window (with regards to range) is calculated. If the ratio is greater than a preset threshold, ionospheric clutter is declared at the top of the reference window and the reference window is shifted downwards. If the ratio is smaller than the reciprocal of the threshold, ionospheric clutter is declared at the bottom of the reference window and the reference window is shifted upwards. In both cases the CUT remains at the same position and the reference window is shifted by a greater amount as the magnitude of the clutter increases. However, the shifting of the reference window is limited in that the CUT must remain within the shifted reference window.

At step 76, the range-Doppler radar values in the reference window are ordered to produce ordered range-Doppler radar values. For example, the range-Doppler radar values are generally ordered from smallest to largest but can also be ordered from largest to smallest, provided that the analysis in step 78 is adjusted.

At step 78, an average value of a percentage of the ordered range-Doppler radar values is obtained based on a percentage threshold. The percentage threshold specifies the number of cells in the reference window which are used to obtain the average value. For example, if there are 10 values in the reference window and the percentage threshold is 70%, then the smallest 70% of the total number of cell values (in this case 7 cells) are used to compute the average value. As another example, if the percentage threshold is 60%, then the smallest 60% of the total number of cell values (in this case 6 cells) are used to compute the average value. There are various ways in which the percentage threshold can be set. For example, the percentage threshold can be adjusted by looking at the false tracks ratio in the final track file that is generated by the track generator 36 either through offline analysis or adaptive self-adjustment. For different radar sites and radar data sets, the dependence of the percentage threshold on the false tracks ratio can vary and the desired percentage threshold can be determined after a few test runs on test data sets for the radar site of interest. In an alternative embodiment, the percentage threshold can be increased in signal rich environments and decreased in sparse signal environments. For example, maximum and minimum percentage thresholds can be set based on extremely noisy and quiet scenarios for the environment of the CUT, respectively. The radar system 10 can then adapt the percentage threshold between these maximum and minimum percentage thresholds based on the number of false plots or false tracks.

At step 80, the average value is multiplied by a threshold coefficient to obtain a threshold value. The threshold coefficient is selected depending on the size of the reference window and a desired detection probability or false alarm rate that can be determined based on experimental results. The threshold coefficient can also be determined by examining the false track ratio as well and selecting the threshold coefficient such that the false track ratio is at an acceptable level. As an example, the threshold coefficient can be selected to be between 10-12 dB. In addition, in at least some embodiments, the threshold coefficient can change with range index. Furthermore, in at least some embodiments, the threshold coefficient that is used for CUTS that are at near range can be selected to be greater than the threshold coefficient that is at the far range. In an alternative embodiment, the threshold coefficient can also be increased if the CUT is in an ionospheric clutter region to reduce the false alarm rate.

At step 82, the range-Doppler radar value in the CUT is compared with the threshold value to detect a possible radar target, hi particular, a target is detected if the radar value associated with the CUT is larger than the threshold value.

It should be noted that alternative embodiments of the simplified censored CA-CFAR detection method 70 can be used in other applications in which the steps 72 and 74 are optional. Some examples include; but are not limited to, environments with less ionospheric clutter, environments with less higher-order sea clutter, and air traffic control radar systems. In each of these examples, the simplified censored CA-CFAR detection method 70 can be applied without steps 72 and 74 while obtaining satisfactory detection results.

In addition to the simplified censored CA-CFAR detection method 70, there are other different types of CFAR detection methods that use different operations for determining the background noise in the reference window used in CFAR radar detection. These different CFAR detection methods have different strengths as well as different weaknesses as will now be reviewed.

The Cell Averaging (CA)-CFAR detection method assumes that the local noise environment is homogeneous and determines the background noise level in the reference window by averaging the cells in the reference window. The CA-CFAR detection method then adds a constant to the estimated background noise level or multiplies the estimated background noise level by a certain factor to obtain the threshold that is used for detection. The CA-CFAR detection method is known as a consistent, unbiased minimum-variance estimator that is designed for use in homogeneous environments, where its performance converges to the optimal performance when the reference cells contain Independent and Identically Distributed (IID) observations. However, there is significant degradation in performance for the CA-CFAR detection method when the local noise environment is not homogeneous. For example, when there is a clutter edge in the reference window, the increased background noise power degrades the performance of the CA-CFAR detection method due to excessive false alarms and target masking due to an increase in the estimated noise level which results in an unnecessarily high threshold. Furthermore, when there are two or more closely-spaced targets in the window, the stronger target will generally be detected while the weaker target will be missed, since the noise power estimate is biased by the stronger target which again results in an unnecessarily high threshold. Both of these effects become worse as the clutter power increases.

The Order Statistics (OS)-CFAR detection method is based on sorted cells in the reference window to enhance the robustness of the detector when operating in non-homogeneous or multi-target environments. Accordingly, the OS-CFAR detection method is preferred when performing detection against a background of non-uniform clutter. The OS-CFAR detection method estimates the noise power by selecting the $k^{th}$ largest cell (e.g. the cell with the $k^{th}$ largest radar value) in the reference window. The OS-CFAR detection method is effective in resolving closely spaced targets (up to a maximum of k different targets without range spread). However, the OS-CFAR detection method can generate high false alarm rates when there is banded clutter such as ionospheric clutter or coherent sea clutter in the reference window.

The Smallest Of (SO)-CFAR detection method was developed to prevent the suppression of closely spaced targets by calculating the mean value of the cells in the portion of the reference window that lies to the left (i.e. the leading window) of the CUT to obtain a first mean value and then calculating the mean value of the cells in the portion of the reference window that lies to the right (i.e. the lagging window) of the CUT to obtain a second mean value. The smaller mean value is used as the estimation of noise power.

In cases where the reference window is two dimensional, the reference window is first divided into two sub-windows along the Doppler dimension. The first sun-window (i.e. the leading window) will be the half of the reference window that lies to the left of the CUT and the second sub-window (La the lagging window) will be the half of the reference window that lies to the right of the CUT. The first and second mean values can then be calculated based on the cells in the first and second sub-windows respectively.

The detection performance of the SO-CFAR detection method degrades considerably if interfering targets are located in both the leading and lagging windows. Furthermore, the SO-CFAR detection method fails to maintain a constant false alarm rate when clutter edges are in one of the leading or lagging windows in that the SO-CFAR detection method selects the smaller noise estimation in the two sub-windows which allows the clutter to be detected.

Another CFAR detection method that is sometimes used is the Greatest Of (GO)-CFAR detection method which is somewhat analogous to the SO-CFAR detection method. The GO-CFAR detection method was developed to prevent false alarm break through due to a clutter transition in the reference window by calculating the mean value of the cells in the portion of the reference window that lies to the left (i.e. the leading window) of the CUT to obtain a first mean value and then calculating the mean value of the cells in the portion of the reference window that lies to the right (i.e. the lagging window) of the CUT to obtain a second mean value. The greater mean value is used as the estimation of noise power.

Figure 6:
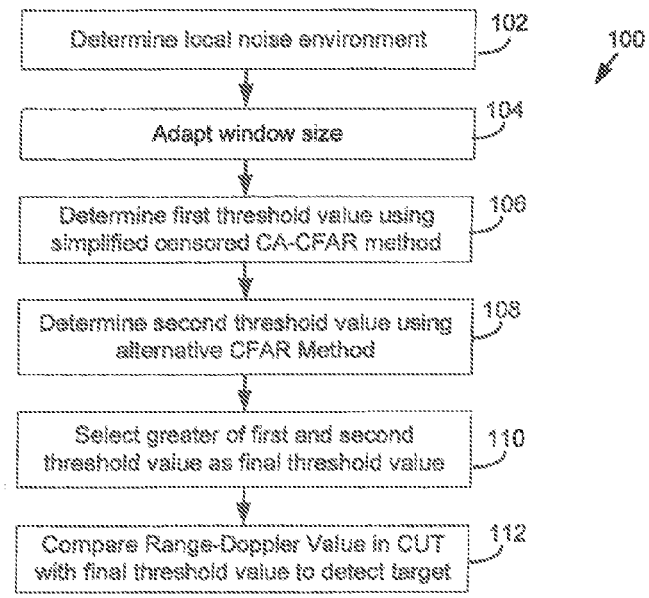
FIG. 6 is a flowchart of an example embodiment of a hybrid CFAR detection method comprising the simplified censored CA-CFAR method and a second CFAR method.

The performance of these different CFAR detection methods can be improved upon by combining these detection methods with the simplified censored CA-CFAR detection method. Referring now to FIG. 6, shown therein is a flowchart of an example embodiment of a hybrid CFAR detection method 100 comprising the simplified censored CA-CFAR method and a second CFAR method. In general, the hybrid CFAR detection method 100 involves determining thresholds according to two different CFAR detection methods and then performing detection using the larger of the two thresholds. The hybrid CFAR detection method 100 typically first determines the local noise environment and then adapts the window size prior to determining the CFAR detection thresholds according to the different CFAR detection methods. However, in alternative embodiments, there can be cases in which the hybrid CFAR detection method 100 is performed without determining the local noise environment and without adapting the window size based on the local noise environment (i.e. without steps 102 and 104). For example, this can be done in environments with less ionospheric clutter and/or less high-order sea clutter as well as possibly air traffic control radar applications. The hybrid CFAR detection method 100 is particularly useful in situations for reducing the false alarm rate when there is high background noise since a larger threshold is used with this technique.

In the example embodiment of FIG. 6, steps 102 to 106 of the hybrid CFAR detection method 100 are similar to steps 72 through 80 of the simplified censored CA-CFAR method 70. However, at step 108, the hybrid CFAR detection method 100 involves determining a second threshold according to a second CFAR detection method that is different from the simplified censored CA-CFAR detection method. Many different CFAR detection methods can be used such as, but not limited to, CA-CFAR, OS-CFAR, SO-CFAR, GO-CFAR, and Trimmed Mean (TM)-CFAR can be used in alternative embodiments. The selection of the second CFAR detection method depends on the statistics of the cells in the reference window and the location of the reference window.

At step 110, the greater of the thresholds determined by the simplified censored CA-CFAR method and the second CFAR method is then selected as the threshold for the hybrid CFAR detection method 100. In some cases, the thresholds that are calculated by each CFAR detection method can be increased as explained in steps 78 and 80 of CFAR detection method 70. In some embodiments where the radar system requires a high probability of detection and the false alarm rate is not a concern, the smaller of the two thresholds could be selected as the final threshold. Another example of whether the smaller of the two thresholds can be used is for target detection around Bragg lines (i.e. first-order sea clutter).

At step 112, the range-Doppler radar value in the CUT is compared with the threshold value to detect a possible radar target. In particular, a target is detected if the radar value associated with the CUT is larger than the threshold value.

Figure 7:
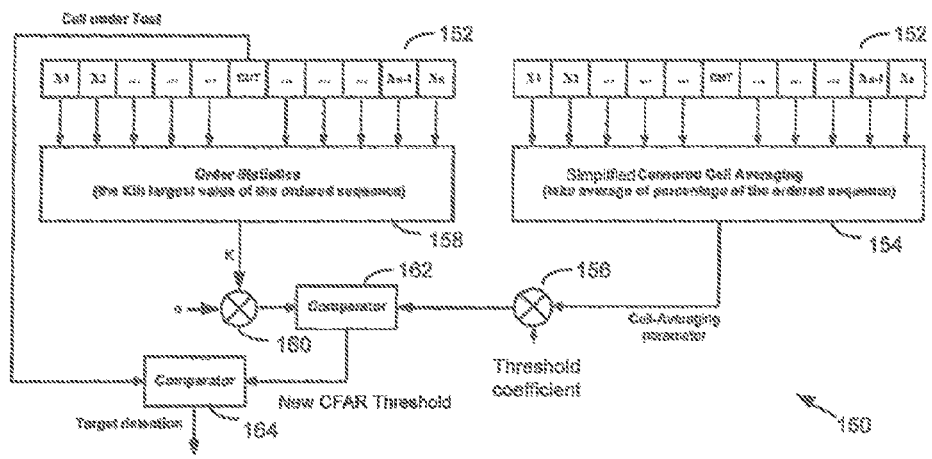
FIG. 7 is a schematic of an example embodiment of a hybrid CFAR detection method comprising the simplified censored CA-CFAR method and an Order Statistics (OS)-CFAR method.

Referring now to FIG. 7, shown therein is a schematic of an example embodiment of a hybrid CFAR detection method 150 comprising the simplified censored CA-CFAR detection method and an Order Statistics (OS)-CFAR detection method (which can also be referred to as an Ordered Statistics CFAR detection method). The cells in the reference window are arranged into an ordered array of cell values 152 from smallest value to largest value. The simplified censored CA-CFAR detection method 154 then takes an average of a percentage of the values in the ordered array 152 to determine the noise background (also referred to as a cell-averaging parameter) and multiplies by a threshold coefficient at 166 to obtain a first CFAR threshold, while the OS-CFAR detection method 158 takes the $k^{th}$ largest value of the ordered array 152 as the noise background level (K) which in general can be multiplied by the parameter $\alpha$ to determine a second CFAR threshold. However, for the radar data encountered by an HFSWR radar system, the parameter $\alpha$ can be set to 1. In other embodiments where no hybrid scheme deployed, the parameter $\alpha$ could be set to other values. The first and second CFAR thresholds are compared at 162 to obtain a new CFAR threshold (based on the largest of the first and second CFAR thresholds). In alternative embodiments, additional logic can be added to the comparator 162 to incorporate some feedback in the threshold decision so as to make the threshold more accurate. The CUT is then compared at 164 with the new CFAR threshold to determine if there is a possible target at the CUT.

Figure 8:
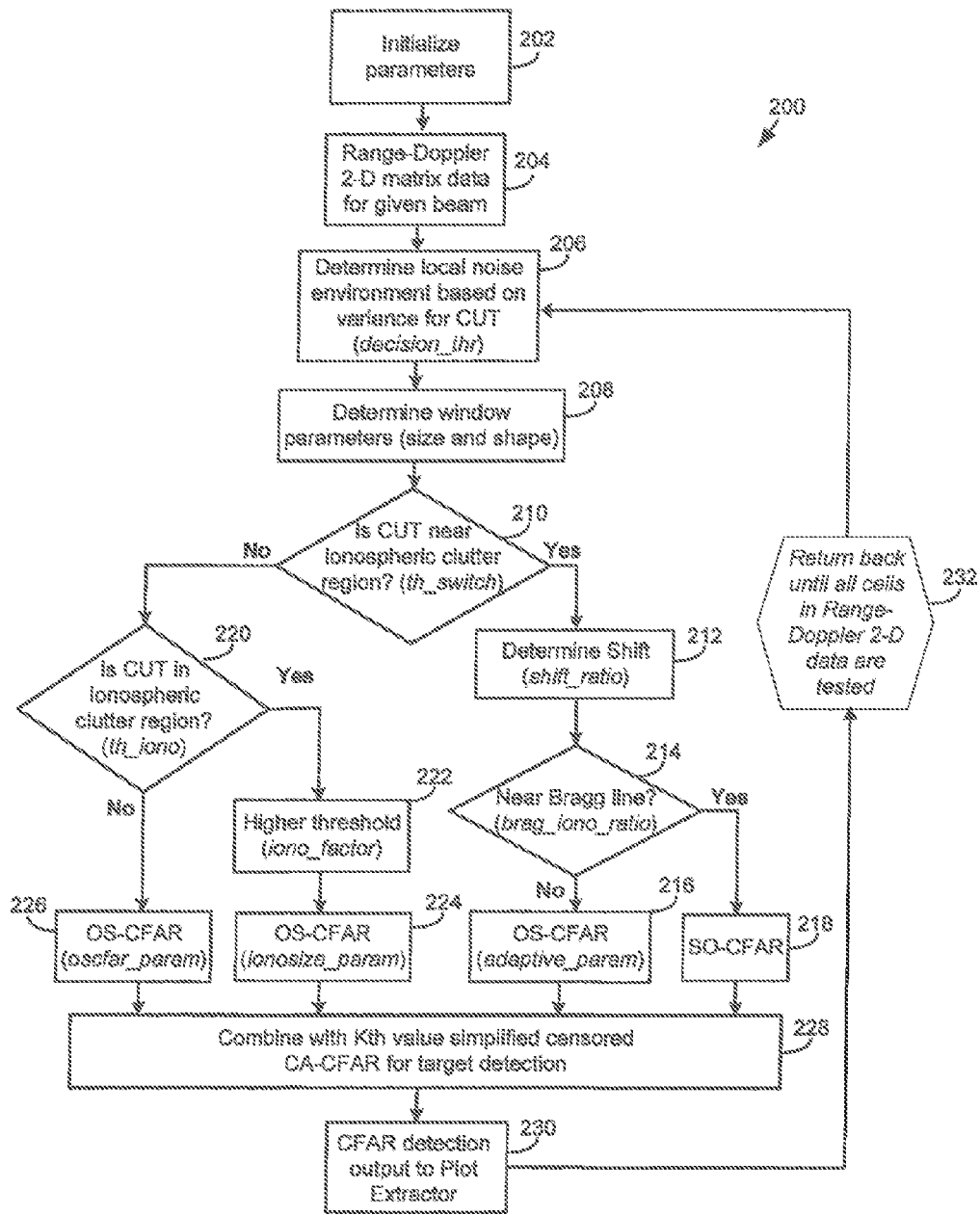
FIG. 8 is a flowchart of an example embodiment of a knowledge-aided hybrid CFAR detection method.

Referring now to FIG. 8, shown therein is a flowchart of an example embodiment of a Knowledge-Aided Hybrid (KAH)-CFAR detection method 200. The KAH-CFAR detection method 200 utilizes several different hybrid CFAR detection methods that are well suited for particular types of noise environments. The KAH-CFAR detection method 200 uses knowledge about the local environment of a CUT to decide which CFAR detection methods to incorporate into the detection process. This generally involves determining whether the location of the CUT is near an ionospheric clutter region, within an ionospheric clutter region or far from an ionospheric clutter region. This can also include determining if the CUT is near a Bragg line in some cases. These determinations can be made based on the local noise environment of the CUT. Furthermore, the KAH-CFAR detection method 200 uses knowledge of the local environment of the CUT to select a combination of a simplified censored CA-CFAR detection method and a second CFAR detection method which can include one of an OS-CFAR detection method, a SO-CFAR detection method and a CA-CFAR method. In alternative embodiments the second CFAR detection method can include, but is not limited to, the Trimmed Mean (TM)-CFAR and GO-CFAR detection methods.

The KAH-CFAR detection method 200 also uses the knowledge of the local environment of a CUT to adapt the size and shape of the reference window associated with the CUT. In some cases, in order to control the number of detections, the thresholds that are used in at least some of the CFAR detection methods can be adapted. For example, the percentage threshold of the censored CA-CFAR detection method used in the KAH-CFAR detection method 200 can be increased to a higher level in signal rich environments and decreased to a lower level in signal sparse environments. Furthermore, the threshold for the OS-CFAR detection method used in the KAH-CFAR detection method 200 can be increased in certain situations. However, these additional features can be optional in certain applications.

At step 202, the parameters used in the KAH-CFAR detection method are initialized. This can include specifying which radar data file will be processed for detection, specifying the threshold parameters for the various CFAR detection methods used in the KAH-CFAR detection method 200, specifying the parameters of the windows used in the various CFAR detection methods as well as the parameters used to determine the local noise environment of the CUT and the like. Other parameters that are utilized by the KAH-CFAR detection method 200, which are discussed below, can also be initialized at step 202.

At step 204, the range Doppler radar data for a given beam of radar data is selected; in other words a 2D slice of radar data is selected from the 3D radar data that has been collected for a given CPI (remember the three dimensions are range, Doppler and Beam (also known as Azimuth)). At step 206, a particular range-Doppler cell (i.e. the CUT) which will be associated with a reference window of range-Doppler radar values is selected to undergo the target detection process. Step 206 in conjunction with step 232 ensures that all of the range-Doppler cells for the given radar beam are processed. These cells can be traversed in an order of range and than Doppler. The next beam of radar data can then be processed for detection. This process continues until all of the range-Doppler-beam radar data has been processed for a given CPI. However, in alternative embodiments, if there is an interest in only part of the range coverage, only part of the azimuth coverage, or only targets with specific speed, than only some of the range-Doppler-beam radar data need to be processed.

At step 206, the KAH-CFAR detection method 200 classifies the local noise environment of the CUT to determine properties of the local nose environment. This classification can it determining whether the local noise environment is homogeneous or non-homogenous based on determining a statistic of the range-Doppler values in the reference window and then comparing the statistic with a preset threshold. This classification may also include determining whether the CUT is near an ionospheric clutter region, far from an ionospheric clutter region, in an ionospheric clutter region and/or near a Bragg line. The statistic that can be used in the classification is the variance of the range-Doppler values in the reference window. In an alternative embodiment, the statistic can be the standard deviation of the range-Doppler values in the reference window. In some embodiments, Weibull, Rayleigh or K distributions can be used to describe the behavior of the clutter and then standard histogram techniques can be applied, such as Quantile-Quantile and Percent-Percent (plot) analyses, to determine the statistical characteristics of the clutter. At this point, the reference window size is chosen to provide enough sample points for meaningful statistics, while still representing the local environment of the CUT, ft should be noted that the reference window size and orientation used to determine the local noise environment is not necessarily the same as the reference window size and orientation used for CFAR detection although there may be instances in which the size and orientation of these two reference windows are similar. In this example embodiment, the comparison can be made with respect to the threshold parameter decision_thr, which is an absolute value.

The steps 208 to 214 and 220 allow the KAH-CFAR detection method 200 to select a type of CFAR detection method that is well suited to deal with the local noise environment of the CUT as well as an orientation and size of the reference window (used for CFAR detection) that depends on the location of the CUT in relation to ionospheric clutter and the Bragg lines. The KAH-CFAR detection method 200 then applies the selected CFAR detection method to detect whether there is a possible target at the CUT. In this example embodiment, the selected CFAR detection method is actually a hybrid CFAR detection method that combines two different CFAR detection methods as will be described in steps 216, 218, 224, 226 and 228.

In conventional CFAR detection methods, the reference window is fixed in both size and shape, which does not properly take into account the dynamic and complex nature of the clutter in a range-Doppler map. For example, sea clutter distributes along the range dimension, but ionospheric clutter generally distributes along the Doppler dimension. This clutter can change depending on sea state and time of day. A fixed reference window will yield a biased threshold near a clutter region, potentially suppress nearby targets and possibly allow clutter breakthrough when using conventional CFAR detection methods. Accordingly, at step 208, a size and shape is selected for the reference window (that is used for detection) based on the local noise environment of the CUT to overcome these problems encountered with fixed reference windows. The reference window determined at step 208 is then used in the various hybrid CFAR detection methods that are employed in the KAH-CFAR detection method 200. The size and shape of the reference window can be adapted to the clutter determined by the classification of the local noise environment (which is also known as background clutter) by stretching (i.e. increasing) the dimension of the reference window which is parallel to the clutter distribution and shrinking (i.e. reducing) the dimension of the reference window that is orthogonal to the clutter distribution. This can be done in a similar manner as was shown and discussed with respect to FIG. 5.

At step 208, multiple threshold parameters can be used to decide which window shape and size should be selected. The threshold parameter th_switch is used to determine if the CUT is close to an ionospheric clutter region, the threshold parameter th_iono is used to determine if the CUT is in an ionospheric clutter region, the threshold parameter shift_ratio is used to determine how much to shift the reference window away from an ionospheric clutter region if the CUT is near an ionospheric duffer region. Regarding the Bragg lines, the theoretical Doppler indices for Bragg lines at certain operational frequencies are fixed and can be calculated accordingly. However, there can be shifts in the Bragg lines due to surface currents which are handled by the method 200. Alternatively, the decision on the reference window shape and size can be made in conjunction with which CFAR detection methods are used since the selection of the reference window shape and size as well as which CFAR detection methods to employ can be made based on the same comparisons to the thresholds (this also applies for method 250).

At step 210, the KAH-CFAR detection method 200 determines if the CUT is in dose proximity to an ionospheric clutter region. This determination can be made by comparing the background noise level (obtained from step 206) with a threshold th_switch. If the background noise level is above the threshold level th_switch, then the KAH-CFAR detection method 200 moves to step 212 where the reference window is shifted, otherwise the KAH-CFAR detection method 200 moves to step 220 and the reference window is not shifted.

At step 212, it has been determined that the CUT is in dose proximity to ionospheric clutter and the KAH-CFAR detection method 200 then determines a shift factor and shifts the window by the shift factor away from the ionospheric clutter. The shift factor can be a pre-defined parameter shift_ratio which is typically an absolute value. In an alternative, the shift ratio can be a variable of the size and magnitude of the ionospheric clutter. The entire 2D reference window is shifted away from the ionospheric clutter region by the amount shift_ratio while keeping the CUT in the same location. Typically, the shift is a vertical shift, which is along the range dimension as the ionospheric clutter is usually located along the Doppler dimension. When the CUT is dose to both ionospheric clutter and Bragg lines, the shift is both vertical and horizontal. In some cases it is possible that the amount of the shift is such that the CUT shifts to the edge of the reference window. Since both O& FAR and Simplified censored CA-CFAR use a sorted window, this shift will affect the calculation (i.e. estimation) of the background level.

At step 214, the KAH-CFAR detection method 200 determines whether the CUT is near a Bragg line. This can be determined by comparing the background noise level (obtained from step 206) with a threshold brag_iono_ratio. If the background noise level is below the threshold level brag_iono_ratio, then the CUT is not near a Bragg line and the KAH-CFAR detection method 200 moves to step 216, otherwise the KAH-CFAR detection method 200 moves to step 218.

At step 216, it has been determined that the CUT is not in dose proximity to a Bragg line but is in dose proximity to an ionospheric clutter region. Accordingly, the KAH-CFAR detection method 200 selects the CFAR detection method to be a combination of an OS-CFR detection method and the simplified censored CA-CFAR detection method. In this example, a portion of the OS-CFAR detection method is performed to determine a first CFAR threshold. The OS-CFAR detection method is performed using the parameters adaptive_param to specify a size for the reference window (determined in step 208) as well as the value of K used to determine the $K^{th}$ value for background noise level estimation. A portion of the simplified censored CA-CFAR detection method is then performed at step 228 to determine a second threshold. Step 228 also includes using the larger of these first and second thresholds to perform CFAR detection on the CUT to determine if there is a possible target at the CUT. Accordingly, the combination of steps 216 and 228 performs a hybrid CFAR detection method as was shown and explained with regards to FIG. 6. The order of performing the OS-CFAR and simplified censored CA-CFAR detection methods is not important as either can be done first in order to determine the final CFAR threshold that is used for detection (this also applies to the operation of the CFAR detection methods in steps 218, 222 and 224). Since the CUT is near an ionospheric clutter region and is not near a Bragg line, the reference window that is used, as was determined in step 208, can be oriented in a similar manner as the reference window 94 shown in FIG. 5. Accordingly, at this point the reference window used by the OS-CFAR and simplified censored CA-CFAR detection methods is oriented along the Doppler dimension.

At step 218, since the CUT is in dose proximity to a Bragg line, the KAH-CFAR detection method 200 selects the hybrid-CFAR detection method to be a combination of a SO-CFAR detection method and a simplified censored CA-CFAR detection method. A portion of the SO-CFAR detection method is performed to determine a first threshold and then step 228 is performed as described previously to determine if there is a possible target at the CUT. In this case, since the CUT is near an ionospheric clutter region and near a Bragg line, a reference window, as was determined in step 208, can be used that is oriented in a similar fashion as the reference window 94 shown in FIG. 5 (this is similar as in steps 216 and 228 since prior to step 218 the reference window was shifted away from an ionospheric clutter region in step 214). Accordingly, at this point the reference window used by the SO-CFAR and simplified censored CA-FAR detection methods is oriented along the Doppler dimension.

At step 220, the KAH-CFAR detection method 200 determines whether the CUT is in an ionospheric clutter region. This is different from the decision at step 210 which considers how far the CUT is from the outside of an ionospheric clutter region while step 220 considers whether the CUT is within an ionospheric clutter region. This can be determined by comparing the background noise level (obtained from step 206) with a threshold th_iono. If the background noise level is below the threshold level th_iono, then the CUT is not in or near an ionospheric clutter region and the KAH-CFAR detection method 200 moves to step 226, otherwise the CUT is determined to be in an ionospheric clutter region and the KAH-CFAR detection method 200 moves to step 222.

At step 226, since the CUT is not in close proximity to an ionospheric clutter region and not in an ionospheric clutter region, the KAH-CFAR detection method 200 essentially selects the CFAR detection method to be a combination of an OS-CFAR detection method and a simplified censored CA-CFAR detection method. In this example, a portion of the OS-CFAR detection method is performed to determine a first CFAR threshold. The OS-CFAR detection method is performed using the parameters oscfar_param which specify a size for the reference window (determined in step 208) as well as the value of K used to determine the $K^{th}$ value for background noise level estimation; both of these will typically not be the same as the values used for the OS-CFAR detection method of step 216. Step 228 is then performed as described previously to determine if there is a possible target at the CUT. In this case, since the CUT is not near an ionospheric clutter region, the reference window that is used can have a similar orientation as the reference window 96 shown in FIG. 5. Accordingly, at this point the reference window used by the OS-CFAR and simplified censored CA-CFAR detection methods will be oriented along the range dimension.

At step 222, since the CUT is within an ionospheric clutter region, the KAH-CFAR detection method 200 will select the type of CFAR detection method to be a combination of an OS-CFAR detection method and a simplified censored CA-CFAR detection method. Since the noise level is particularly high within an ionospheric clutter region, at step 222, a threshold parameter (e.g. a, see FIG. 7) used in the OS-CFAR detection method is increased to reduce the chance of noise being detected as a possible target.

At step 224, a portion of the OS-CFAR detection method is performed to determine a first CFAR threshold while using the higher threshold factor based on the parameter iono_factor. The OS-CFAR detection method is also performed using the parameters ionosize_param which specify a size for the reference window (determined in step 208) as well as the value of K used to determine the $K^{th}$ value for background noise level estimation; both of these will typically not be the same as the values used for the OS-CFAR detection methods of steps 216 and 226. Step 228 is then performed as described previously to determine if there is a possible target at the CUT. In this case, since the CUT is in an ionospheric clutter region, a reference window can be used that is oriented in a similar fashion as the reference window 98 shown in FIG. 5. Accordingly, at this point the reference window used by the OS-CFAR and simplified censored CA-CFAR detection methods of steps 224 and 228 can be oriented along the Doppler dimension. In this case, no adjustment is needed if the CUT is close to a Bragg line since the reference window is in a clutter region and will include values from both the Bragg line and the ionospheric clutter region which will all be high in value and these high values are accounted for by using a higher threshold (due to the parameter iono_factor) in the OS-CFAR detection method of step 222.

After the CFAR detection is completed at step 228, regardless of which combination of CFAR detection methods is used, the KAH-CFAR detection method 200 moves to step 230 at which point a possible CFAR detection output is sent to the plot extractor 34. In alternative methods, this CFAR detection output can be sent to other elements of the radar system 10 such as the track generator 36 or the classifier 38. At this point the KAH-CFAR detection method 200 then proceeds to step 232 to process a different range-Doppler cell for the current beam.

Figure 9:
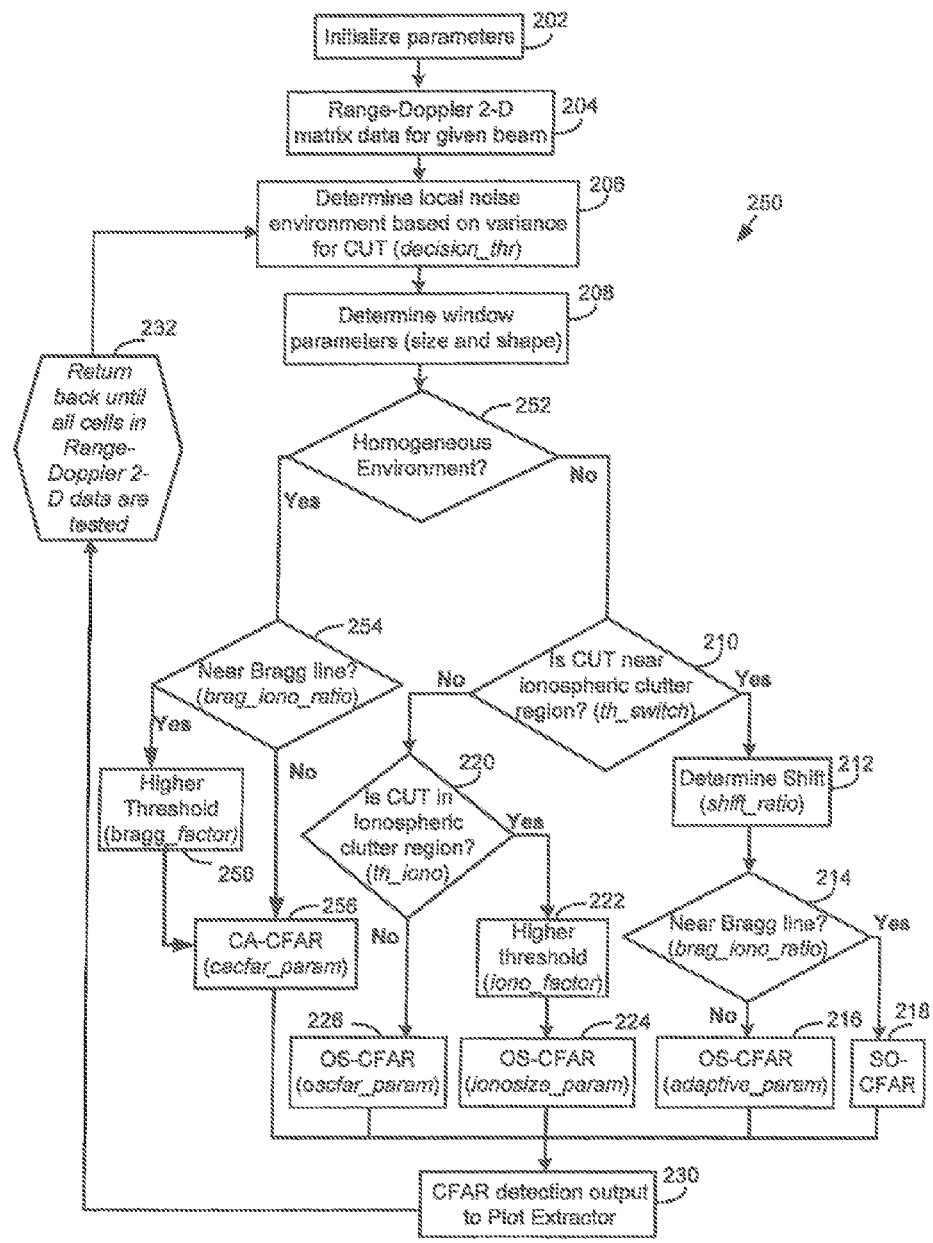
FIG. 9 is a flowchart of an example of another embodiment of a knowledge-aided hybrid CFAR detection method.

There can be various alternatives to the KAH-CFAR detection method 200 which still utilize knowledge of the local environment of the CUT to select a particularly effective CFAR detection method as well as adapt parameters of the selected CFAR detection method including the reference window which is used. For example, referring now to FIG. 9, shown therein is a flowchart of an example of another embodiment of a KAH-CFAR detection method 250. The KAH-CFAR detection method 250 is similar to the KAH-CFAR detection method 200, which is indicated by the similarly numbered steps. However, the KAH-CFAR detection method 250 differs from the KAH-CFAR detection method 200 since there is an additional processing branch for situations in which a homogenous environment is detected and combined CFR detection methods for different conditions of the local environment of the CUT are not used. This additional processing is not used in the KAH-CFAR detection method 200 since it utilizes hybrid-CFAR detection methods (i.e. a combination of two CFAR-detection methods) for different conditions of the local environment of the CUT.

The KAH-CFAR detection method 250 can be used in situations in which the determination of whether a local noise environment of a CUT is homogenous or non-homogenous is very reliable, such as during certain times of the day, for certain radar installation sites, or for certain sea states, for example, when a fixed threshold is used to determine whether the local environment is homogeneous or non-homogeneous. To make the judgement of the local noise environment even more reliable, a variable threshold can be applied according to the statistics of the cells in the reference window. The advantage of the KAH-CFAR detection method 250 over the KAH-CFAR detection method 200 is reduced computational complexity. For the KAH-CFAR detection method 200, two different CFAR detection methods must be performed to determine the threshold that is used for CFAR detection in the CUT with different local noise environments, meanwhile for the KAH-CFAR detection method 250, only one CFAR detection method has to be performed once the noise environment is determined to be homogenous or non-homogenous and the local environment (i.e. the types of clutter) around the CUT is determined. The steps in the KAH-CFAR detection method 250 that are different than the KAH-CFAR method 200 will now be discussed.

After the local noise environment is determined in step 206, which can also be used to determine the window parameters in step 208, the KAH-CFAR detection method 250 makes a processing decision at step 252 depending on whether the local noise environment of the CUT is homogenous or non-homogenous (this classification can be made at step 206 based on the threshold comparison).

If the local environment of the CUT is non-homogenous meaning that the local environment is "noisy" or full of peaks, the KAH-CFAR detection method 250 performs step 210 and some of steps 212 to 226 depending on the local noise environment of the CUT. Steps 210 to 226 are generally performed the same way as described for the KAH-CFAR detection method 200 with the exception that the threshold from the simplified censored CA-CFAR detection method is not calculated and used, and the thresholds determined from the various CFAR detection methods of steps 216, 218, 224 and 226 are used for CFAR detection where applicable.

If the local environment of the CUT is homogenous, meaning that the local environment is fairly flat or can be considered to have a Gaussian distribution, then the KAH-CFAR detection method 250 performs step 254 in which it is determined whether the CUT is near a Bragg line. If the CUT is not near a Bragg line, then at step 256, the CA-CFAR detection method is used with a reference window having a size that is specified by the parameter cacfar_param. Since the CUT is not near an ionospheric clutter region (since the local environment of the CUT is homogenous) and is not near a Bragg line, a reference window can be used that has a similar orientation as the reference window 94 shown in FIG. 5. Accordingly, at this point the reference window used by the CA-CFAR detection method can be oriented along the range dimension.

If it is determined at step 254 that the CUT is near a Bragg line, then the KAH-CFAR detection method 250 moves to step 258 in which a higher threshold factor is set according to the parameter bragg_factor. In general, it is known how close the CUT is to the theoretical Bragg lines based on the number of Doppler cells that the CUT is away from the theoretical Bragg lines. In an alternative, the parameter Bragg factor could be set to be dependent on the magnitude of the clutter due to the Bragg lines or how dose the CUT is to the Bragg lines. The CA-CFAR detection method is then performed at step 256 with the higher threshold factor to deal with the higher values in the reference window since the CUT is near the Bragg line. The higher threshold factor will allow for a smaller false alarm rate.

It should be noted that in the KAH-CFAR detection methods 200 and 250, the parameters decision_thr, th_switch, th_iono, iono_factor, shift_ratio, brag_iono_ratio and bragg_factor are generally absolute values which can change depending on environmental factors such as the location of the installation site of the radar system 10, the time of day during which the radar values are being collected by the radar system 10 as well as possibly the range gate (e.g. the range value of the CUT). These parameters, along with the parameters oscfar_param, ionosize_param, adaptive_param and cacfar_param, can be determined by performing simulation and experiments such that values are selected for these parameters that result in a desired detection rate and false alarm rate.

It should be noted that the various knowledge-aided and/or hybrid CFAR detection methods described herein can be performed by the detector 32. The detector 32 can be implemented via software that is executed by a processor. In some embodiments, the processor can be a dedicated processor. In other embodiments, the processor can provide more than one function and can be used to implement several of the blocks of the radar system 10 shown in FIG. 1. For example, the processor of the control unit 12 can provide one or more of the functions of the receiver subsystem 22.

In each of the embodiments described herein, the detector 32 comprises an input, a processor and an output coupled to one another. The input receives the range-Doppler radar values of the reference window and the CUT. The processor (not shown) is coupled to the input and is configured to process the range-Doppler radar values of the reference window and the CUT to provide an indication of target detection by performing one of the various knowledge-aided, hybrid or simplified censored CA-CFAR detection methods described herein. The output is coupled to the processor for providing an indication of target detection to a component of the radar system 10, such as the plot extractor 34, the track generator 36, the classifier 38 or the output device 40.

At least some of the elements of the various CFAR detection methods described herein that are implemented via software may be written in a high-level procedural language such as object oriented programming or a scripting language. Accordingly, the program code may be written in C, C++, SQL or any other suitable programming language and may comprise modules or classes, as is known to those skilled in object oriented programming. At least some of the elements of the various CFAR detection methods described herein that are implemented via software may be written in assembly language, machine language or firmware as needed. In either case, the program code provides a plurality of instructions that can be stored on a storage media or on a computer readable medium that is readable by a microprocessor of a general or special purpose programmable computing device having an operating system and the associated hardware and software that is necessary to implement the functionality of at least one of the embodiments described herein. The program code, when read by the processor of the computing device, configures the computing device to operate in a new, specific and predefined manner in order to perform at least one of the CFAR detection methods described herein.

It should also be noted that at least some of the CFAR detection methods described herein are capable of being distributed in a computer program product comprising a computer readable medium that bears computer usable instructions for one or more processors. The medium may be provided in various forms such as, but not limited to, one or more diskettes, compact disks, tapes, chips, USB keys, external hard drives, wire-line transmissions, satellite transmissions, Internet transmissions or downloads, magnetic and electronic storage media, digital and analog signals, and the like. The computer useable instructions may also be in various forms, including compiled and non-compiled code.

While the applicant's teachings are described herein in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

The invention claimed is:

1. A method of performing target detection in a radar system on a Cell Under Test (CUT) associated with a reference window of range-Doppler radar values, wherein the method comprises:

by a detector of the radar system:

determining if a local noise environment of the CUT is homogeneous or non-homogenous; and picking a size of the reference window based on whether the local noise environment is homogeneous or non-homogeneous;

ordering the range-Doppler radar values in the reference window to produce ordered range-Doppler radar values;

obtaining an average value of a percentage of the ordered range-Doppler radar values based on a percentage threshold;

multiplying the average value by a threshold coefficient to obtain a first threshold value; and detecting a target if a radar value associated with the CUT is larger than the first threshold value.

2. The method of claim 1, wherein determining whether the local noise environment is homogeneous or non-homogeneous comprises:

determining a statistic of the range-Doppler values in a second reference window containing the CUT; and comparing the statistic with a predefined noise threshold, wherein the statistic comprises one of a variance and a standard deviation.

3. The method of claim 1, wherein the method further comprises orienting the reference window along the Doppler dimension if the CUT is determined to he in or near an ionospheric clutter region.

4. The method of claim 1, wherein the method further comprises orienting the reference window along the range dimension if the CUT is near a Bragg line and is not in an ionospheric clutter region or is not near the ionospheric clutter region.

5. The method of claim 1, wherein the method further comprises determining the threshold coefficient based on a size of the reference window and a detection probability.

6. The method of claim 1, wherein the method further comprises increasing the percentage threshold in signal rich environments and decreasing the percentage threshold in sparse signal environments.

7. A method of performing target detection in a radar system on a Cell Under Test (CUT) associated with a reference window of range-Doppler radar values, wherein the method comprises:

by a detector of the radar system:

obtaining a first threshold value according to a first different CFAR detection method comprising the steps of:

ordering the range-Doppler radar values in the reference window to produce ordered range-Doppler radar values;

obtaining an average value of a percentage of the ordered range-Doppler radar values based on a percentage threshold; and multiplying the average value by a threshold coefficient to obtain the first threshold value;

obtaining a second threshold value according to a second different CFAR detection method;

setting a third threshold value to the larger of the first and second threshold values; and detecting a target if a radar value associated with the CUT is larger than the third threshold.

8. The method of claim 7, wherein the second CFAR detection method comprises one of an Order-Statistics CFAR detection method, a Smallest-Of CFAR detection method, a Cell-Averaging CFAR detection method, a Greatest Of (GO)-CFAR detection method and a Trimmed Mean (TM)-CFAR detection method.

9. The method of claim 7, wherein prior to the ordering step the method further comprises:

determining if a local noise environment of the CUT is homogeneous or non-homogenous; and picking a size of the reference window based on whether the local noise environment is homogeneous or non-homogenous.

10. The method of claim 9, wherein determining whether the local noise environment is homogeneous or non-homogeneous comprises:

determining a statistic of the range-Doppler values in a second reference window containing the CUT; and comparing the statistic with a predefined noise threshold, wherein the statistic comprises one of a variance and a standard deviation.

11. The method of claim 9, wherein the method further comprises orienting the reference window along the Doppler dimension if the CUT is determined to be in or near an ionospheric clutter region.

12. The method of claim 9, wherein the method further comprises orienting the reference window along the range dimension if the CUT is near a Bragg line and is not in an ionospheric clutter region or is not near the ionospheric clutter region.

13. The method of claim 7, wherein the method further comprises determining the threshold coefficient based on a size of the reference window and a detection probability.

14. The method of claim 7, wherein the method further comprises increasing the percentage threshold in signal rich environments and decreasing the percentage threshold in sparse signal environments.

15. A method of performing target detection in a radar system on a Cell Under Test (CUT) associated with a plurality of range-Doppler radar values, wherein the method comprises, by a detector of the radar system:

classifying a local noise environment of the CUT using a first reference window;

selecting a size and a shape of a second reference window based on the classified local noise environment of the CUT;

selecting a type of Constant False Alarm Rate (CFAR) detection method and an orientation of the second reference window depending on a location of the CUT in relation to at least one of an ionospheric clutter region and a Bragg line; and applying the selected CFAR detection method to detect a target at the CUT in the second reference window.

16. The method of claim 15, wherein if the CUT is in dose proximity to the ionospheric clutter region, the method further comprises determining a shift factor and shifting the second reference window by the shift factor away from the ionospheric clutter region.

17. The method of claim 16, wherein if the CUT is in close proximity to a Bragg line, the method further comprises selecting the type of CFAR detection method to be a combination of a Smallest-Of CFAR detection method and a simplified censored Cell-Averaging (CA)-CFAR detection method and orienting the second reference window along a Doppler dimension.

18. The method of claim 16, wherein if the CUT is not in close proximity to a Bragg line, the method further comprises selecting the type of CFAR detection method to be a combination of an Order Statistics (OS)-CFAR detection method and a simplified censored Cell-Averaging (CA)-CFAR detection method and orienting the second reference window along a Doppler dimension.

19. The method of claim 15, wherein if the CUT is not in close proximity to the ionospheric clutter region, the method further comprises selecting the type of CFAR detection method to be a combination of an Order-Statistics CFAR detection method and a simplified censored Cell-Averaging (CA)-CFAR detection method and orienting the second reference window along a range dimension.

20. The method of claim 15, wherein if the CUT is within the ionospheric clutter region, the method further comprises selecting the type of CFAR detection method to be a combination of an Order-Statistics (OS)-CFAR detection method and a simplified censored Cell-Averaging (CA)-CFAR detection method, increasing a threshold parameter used in the OS-CFAR detection method and orienting the second reference window along a Doppler dimension.

21. The method of claim 15, wherein the method further comprises determining if the location of the CUT is near the ionospheric clutter region, within the ionospheric clutter region or far from the ionospheric clutter region.

22. The method of claim 21, wherein the selected CFAR detection method comprises a combination of a simplified censored Cell-Averaging (CA)-CFAR detection method and a second CFAR detection method.

23. The method of claim 22, wherein the second CFAR detection method comprises one of an Order-statistics CFAR detection method, a Smallest-Of CFAR detection method and a Cell-Averaging CFAR detection method.

24. The method of claim 22, wherein applying the combination of the simplified censored CA-CFAR detection method and the second CFAR detection method comprises:
   ordering the range-Doppler radar values in the second reference window to produce ordered range-Doppler radar values;
   obtaining an average value of a percentage of the ordered range-Doppler radar values based on a percentage threshold;
   multiplying the average value by a threshold coefficient to obtain a first threshold value;
   obtaining a second threshold value according to the second CFAR detection method;
   setting a third threshold value to the larger of the first and second threshold values; and
   detecting the target if a radar value associated with the CUT is larger than the third threshold.

25. The method of claim 24, wherein prior to the ordering step the method further comprises:
   determining if a local noise environment of the CUT is homogeneous or non-homogenous using the first reference window; and
   picking a size of the second reference window based on whether the local noise environment is homogeneous or non-homogenous.

26. The method of claim 25, wherein determining whether the local noise environment is homogeneous or non-homogeneous comprises:
   determining a statistic of the range-Doppler values in the second reference window; and
   comparing the statistic with a predefined noise threshold, wherein the statistic comprises one of a variance and a standard deviation.

27. The method of claim 25, wherein the method further comprises orienting the second reference window along the Doppler dimension if the CUT is determined to be in or near an ionospheric clutter region.

28. The method of claim 25, wherein the method further comprises orienting the second reference window along the range dimension if the CUT is near a Bragg line and is not in an ionospheric clutter region or is not near the ionospheric clutter region.

29. The method of claim 24, wherein the method further comprises determining the threshold coefficient based on a size of the second reference window and a detection probability.

30. The method of claim 24, wherein the method further comprises increasing the percentage threshold in signal rich environments and decreasing the percentage threshold in sparse signal environments.

31. The method of claim 15, wherein if the local noise environment is classified as homogeneous, the method further comprises selecting a Cell-Averaging (CA)-CFAR detection method and applying a higher threshold only if the CUT is near a Bragg line.

32. The method of claim 15, wherein if the local noise environment is classified as non-homogenous and if the CUT is in close proximity to the ionospheric clutter region, the method further comprises determining a shift factor and shifting the second reference window by the shift factor away from the ionospheric clutter region.

33. The method of claim 32, wherein if the CUT is in close proximity to a Bragg line, the method further comprises selecting the type of CFAR detection method to be a Smallest-Of CFAR detection method and orienting the second reference window along a Doppler dimension.

34. The method of claim 32, wherein if the CUT is not in close proximity to a Bragg line, the method further comprises selecting the type of CFAR detection method to be an Order Statistics (OS)-CFAR detection method and orienting the second reference window along a Doppler dimension.

35. The method of claim 32, wherein if the CUT is not in close proximity to the ionospheric clutter region, the method further comprises selecting the type of CFAR detection method to be an Order-Statistics CFAR detection method and orienting the second reference window along a range dimension.

36. The method of claim 32, wherein if the CUT is within the ionospheric clutter region, the method further comprises selecting the type of GEAR detection method to be an Order-Statistics (OS)-CFAR detection method, increasing a threshold parameter used in the OS-CFAR detection method and orienting the second reference window along a Doppler dimension.

* * * * *